United States Patent Office 3,171,276
Patented Mar. 2, 1965

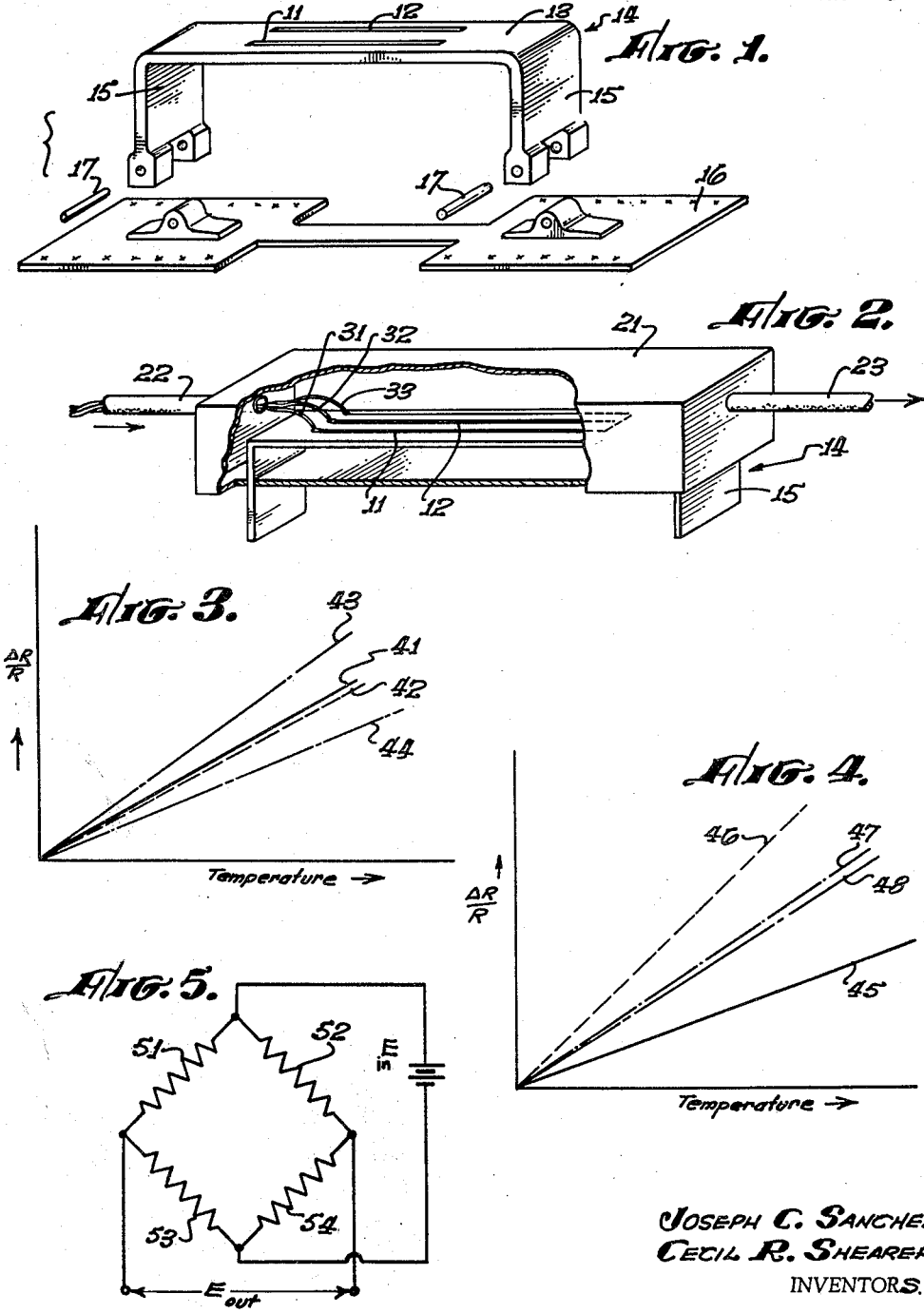

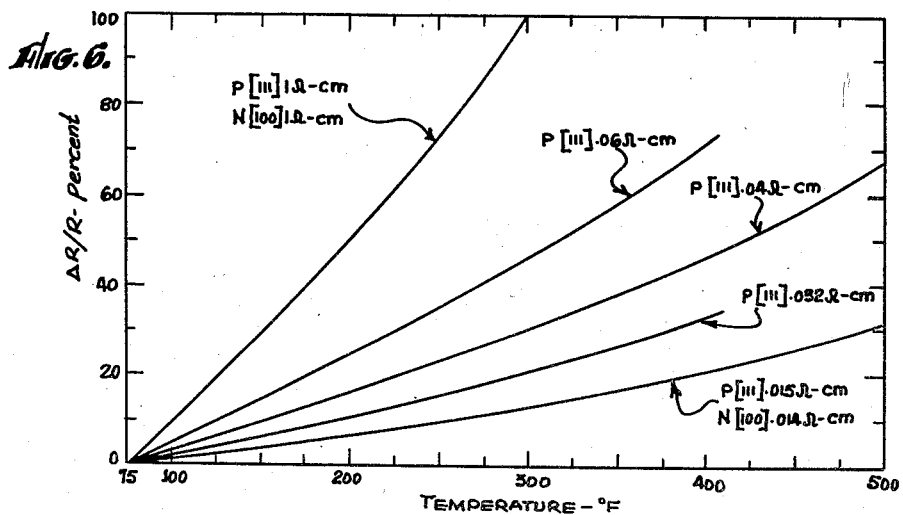
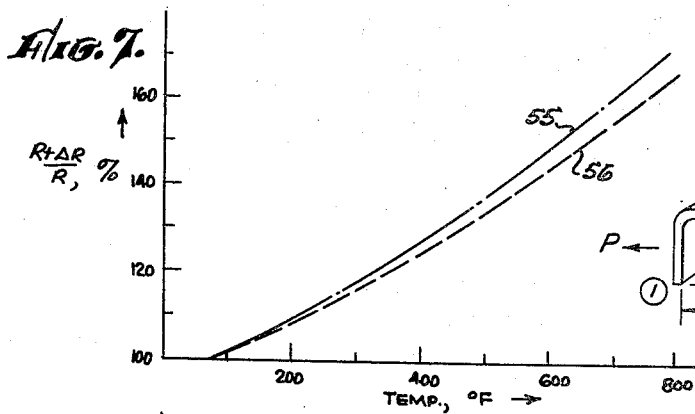
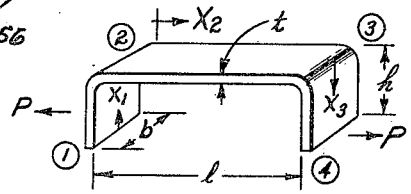
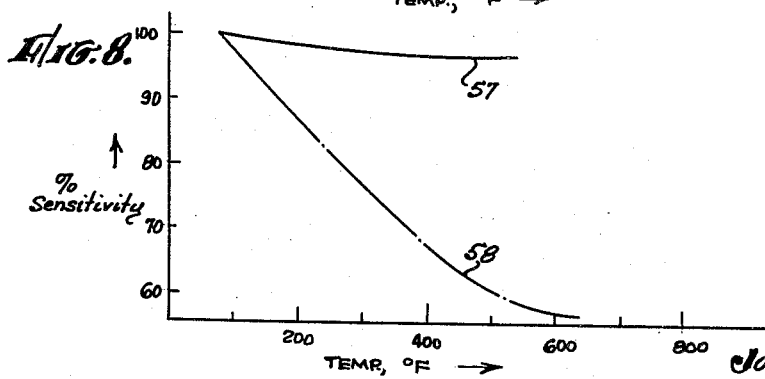
JOSEPH C. SANCHEZ,
CECIL R. SHEARER,
INVENTORS.

3,171,276
HIGH TEMPERATURE STRAIN GAUGE
Joseph C. Sanchez and Cecil R. Shearer, Pasadena, Calif., assignors to Micro Systems, Inc., San Gabriel, Calif., a corporation of California
Filed Apr. 25, 1961, Ser. No. 105,344
6 Claims. (Cl. 73—88.5)

This invention relates to strain gauges and more particularly to sensitive high temperature strain gauges utilizing semiconductor strain-electric translating elements.

In the physical testing of various structures it is often important to determine the behavior of the structure when heavily stressed at high temperatures. Hence, it is desirable to provide strain gauges capable of making accurate static measurements of materials stressed beyond the yield point at high temperatures, a type of strain gauge generally unknown at the present state of the art. Although there are wire and foil strain gauges for measuring post yield strains, these gauges are limited to use in the room temperature region due to their temperature characteristics. Conventional bonded semiconductor strain gauges are usable to maximum strains of about 7,000 microinches per inch at room temperature, but the maximum useful strain level is reduced with increasing temperature when mounted on most conventional metals.

Accordingly, it is an object of the present invention to provided improved strain gauges.

It is another object of the present invention to provide sensitive high temperature strain gauges.

It is also an object of the present invention to provide post yield strain gauges for static measurements at high temperatures.

It is a further object of the present invention to provide improved bonded semiconductor strain gauges capable of measuring strains up to about 50,000 microinches per inch.

It is a still further object of the present invention to provide bonded semiconductor strain gauges capable of accurately measuring strains when attached to a test structure heated to a temperature in excess of 2,000° F.

It is still another object of the present invention to provide bonded semiconductor strain gauge devices capable of measuring strains of up to 50,000 microinches per inch when attached to a test structure heated to a temperature in excess of 2,000° F.

It is also an object of the present invention to provide bonded semiconductor strain gauges which are compensated for zero shift with temperature.

It is yet another object of the present invention to provide a bonded semiconductor strain gauge wherein the gauge element is fluid cooled.

It is a further object of the present invention to provide bonded semiconductor strain gauges instrumented with two gauge elements, one gauge element having a positive gauge factor and the other gauge element having a negative gauge factor.

It is a still further object of the present invention to provide electrical circuitry for semiconductor strain gauge elements.

It is another object of the present invention to provide electrical circuitry for semiconductor strain gauge elements to provide higher gauge sensitivity at elevated temperatures.

It is still another object of the present invention to provide temperature compensating electrical circuitry for bonded semiconductor strain gauges instrumented with two gauge elements.

The objects of the present invention are accomplished by the bonding of semiconductor strain sensitive elements to a novel carrier member having a thermal coefficient of expansion similar to that of the strain sensitive elements. The configuration of the carrier member is such that strain induced in the gauge elements by expansion of the carrier member will be opposite in effect to the strain induced in the gauge elements by thermal expansion of the test structure. Measurements at high test structure temperatures are facilitated by fluid cooling of the gauge elements, the cooling being such that it does not cause undesirable local temperature gradients of the test structure. The device of the present invention is temperature compensated in 3 ways: For zero shift with temperature; for minimum drift over the operating temperature range; and, for minimum decrease in gauge sensitivity with increasing temperature.

The desired cooling is facilitated, in the illustrated preferred embodiment, by utilization of a carrier member in the shape of a channel section. The gauge elements are mounted to the channel web and the web section is enclosed in a fluid tight housing. The carrier member is mounted to the test structure by hinge joints near the extremities of the channel flanges. By proper selection of the carrier member material the strain gauge can be used to measure strains on materials at temperatures too high for conventional bonded semiconductor strain gauges. The strain gauge device of the present invention has a relatively high sensitivity which makes possible the accurate determination of low level strains, and the device can also be used to measure strains in the post yield region (10,000 to 50,000 microinches per inch) without fracturing the gauges. The strain gauge is compensated for zero shift with temperature due to differences in expansion rates of the semiconductor material, the carrier member material, and the test part material by proper orientation and selection of the resistivity of solid state materials and instrumenting the carrier member with both P and N type semiconductor strain gauge elements. The usual drop in gauge sensitivity with increasing temperature is minimized by electrical circuit design. With utilization of fluid cooling the gauge can be used to measure strain on test parts at temperatures of 2,000° F. or more.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 shows an exploded perspective view of a presently preferred embodiment of the strain gauge device of the present invention;

FIGURE 2 is a perspective view, partially cut away, of a liquid cooled version of the device of FIGURE 1;

FIGURE 3 is a graph generally depicting unit resistance change plotted as a function of temperature for various strain gauge elements;

FIGURE 4 is a graph generally depicting unit resistance change plotted as a function of temperature for various strain gauge elements;

FIGURE 5 is a schematic diagram of an asymmetrical bridge circuit showing the method of electrical connection of the semiconductor strain gauge elements in the device of the present invention;

FIGURE 6 is a graph showing the actual resistance change characteristics of various silicon crystals plotted as a function of temperature;

FIGURE 7 is a graph showing the resistance change characteristics of an actual strain gauge of the present invention plotted as a function of temperature;

FIGURE 8 is a graph showing the relative sensitivity of an actual semiconductor strain gauge element plotted as a function of temperature when the element was connected in a simulated bridge circuit energized by a constant current supply and when energized by a constant voltage supply; and FIGURE 9 is a perspective view of the present invention carrier member with various dimensions indicated thereon.

In the development of the device of the present invention it was realized that the use of fluid cooling to extend the temperature range of a gauge element bonded directly to the test structure would result in undesirable local temperature gradients on the test structure. Hence a carrier member in the shape of a channel section was devised, the strain gauge elements being adhesively bonded to the channel web and the projecting ends of the channel flanges adapted to be secured to the test structure by hinge joints. Thus, the web section of the carrier member, instrumented with the strain gauge elements, can be fluid cooled with negligible effect upon the test structure. The physical geometry of a practical embodiment of such a carrier member results in a desensitization factor of from 10 to 30, i.e., the strain gauge element is subjected to only $\frac{1}{10}$ to $\frac{1}{30}$ of the strain applied to the test structure. Wire and foil gauge elements are unsuitable for use in the present invention since their ordinary gauge factor of about 2 would be reduced to an equivalent gauge factor of 0.2 or less when mounted on the channel shaped carrier member. Semiconductor strain gauge elements, on the other hand, have an ordinary gauge factor on the order of 100 and their use on the channel shaped carrier member of the present invention will result in an equivalent gauge factor on the order of 10, thereby providing a usable gauge sensitivity. Furthermore, the novel structure of the carrier member enables the use of solid state gauge elements for measuring low, conventional, and post yield strains at elevated temperatures. The strains induced by the difference in the expansion rates of the gauge element and the test structure generally prohibits the use of semiconductor gauges for measuring strains at temperatures within the range from 500°–800° F. when the gauges are bonded directly to the test structure. (Most steel and aluminum alloys have expansion rates five to ten times greater than silicon, and for a temperature increase of 700° F. from 3500 to 7000 microinches per inch of strain would be induced in the gauge element by temperature alone if the gauge is bonded directly to the test structure.) As mentioned hereinabove, in the channel shaped carrier member structure of the present invention the strains induced in the gauge elements by expansion of the channel section and the test structure are opposite in effect and substantially equal. And, since the carrier member is fabricated of a material having a thermal coefficient of expansion similar to that of the gauge elements the resultant strain in the gauge elements from thermal expansion effects is negligible.

Turning now to the drawing, there is shown in FIGURE 1 a presently preferred embodiment of the novel strain gauge device of the present invention. The embodiment consists of two semiconductor strain gauge elements, 11 and 12, mounted to the outermost surface of the web 13 of a channel shaped carrier member 14, the flanges 15 of which are secured to a mounting strip 16 by pins 17. In use, the mounting strip 16 is welded or otherwise permanently attached to a test structure and the gauge elements 11 and 12 are connected in a bridge circuit, as will be hereinafter explained. Although, the preferred embodiment utilizes a mounting strip and hinge pin form of attachment of the carrier member to the mounting strip, other methods of attachment to the test structure may also be used, the important consideration being to effect a hinged joint. For example, a small angle section can be spot welded, brazed, or otherwise bonded to the ends of the channel flanges, and the angle legs in turn may be bonded or spot welded to the test structure. A hinge joint is approached by using angle legs having a thickness of less than $\frac{1}{10}$ or $\frac{1}{20}$ of the thickness of the channel flanges. Alternatively, the ends of the channel flanges may be bent outward at a 90° angle and the thickness of the channel flange at the bend reduced by chemical etching. However, the structure of the illustrated preferred embodiment enables welding of the mounting strip 16 to the test structure and rapid removal or replacement of the carrier member-gauge element assemblage merely by removing the pins 17.

Two materials suitable for the channel section carrier member 14 are the nickel-cobalt-iron alloys manufactured under the trademarks Therlo (by the Driver Harris Co.) and Rodar (by the Wilbur Driver Co.)

The gauge elements 11 and 12 are preferably fabricated of silicon and possess predetermined gauge factors of opposing characteristics, determined in a manner to be explained hereinbelow under the heading "Temperature compensation." Determination of the physical dimensions of the channel shaped carrier member 14 will now be discussed under the following heading "The channel section carrier member."

*The channel section carrier member*

As stated hereinabove, due to the unusual geometry of the carrier member supporting the strain gauge elements of the present invention the gauge elements are subjected to only a fraction of the actual strain on the test structure. Hence, in the design of such a carrier member it becomes important to know the relationship between the strain on the test structure and the actual strain transmitted to the gauge elements, as well as the strength contribution of the channel section carrier member to the test structure.

Consider the carrier member illustrated in FIGURE 9 and let—

$l$=effective gauge length
$b$=effective gauge width
$h$=effective gauge height
$t$=effective gauge thickness
$P$=tensile force applied to carrier member
$M$=turning moment (subscripts indicating the plane passing through the corresponding encircled numbered points)
$I$=moment of inertia of carrier member
$E$=modulus of elasticity of carrier member
$X$=distance from one point designated by an encircled number to the point designated by the encircled next succeeding number
$\epsilon_m$=unit strain of test structure resulting from force $P$, and
$\epsilon_c$=unit strain of gauge elements resulting from force $P$.

$$M_{1,2}=PX_1$$

$$M_{2,3}=Ph$$

$$M_{3,4}=Ph-PX_3$$

$$\frac{\partial M_{1,2}}{\partial P}=X_1;\ \frac{\partial M_{2,3}}{\partial P}=h;\ \frac{\partial M_{3,4}}{\partial P}=h-X_3$$

Applying Castigliano's theorem:

$$\Delta l=\int M\left(\frac{\partial M}{\partial P}\right)\frac{dX}{EI}$$

$$=\int_1^2 (PX_1)(X_1)\frac{dX_1}{EI}+$$

$$\int_2^3 (Ph)(h)\frac{dX_2}{EI}+\int_3^4 (Ph-PX_3)(h-X_3)\frac{dX_3}{EI}$$

$$=\frac{Ph^2}{EI}(l+2/3h)$$

But—

$$\epsilon_m = \frac{\Delta l}{l}; \quad \epsilon_c = \frac{M_{2,3(c)}}{EI}; \quad M_{2,3} = Ph; \quad \text{and} \quad c = \frac{t}{2}$$

$$\therefore \epsilon_m = \frac{Ph^2}{EIl}(l+2/3h) = \epsilon_c \frac{h}{l(t/2)}(l \times 2/3h)$$

or $$\epsilon_c = \frac{(\epsilon_m) lt}{2h(l+2/3h)}$$

Letting $DF$ = desensitization factor $$DF = \frac{\epsilon_m}{\epsilon_c} = \frac{2h(l+2/3h)}{lt} \quad (a)$$

$$P = \frac{\epsilon_m E I l}{h^2(l+2/3h)}; \quad \text{or} \quad \epsilon_m = \frac{Ph^2(l+2/3h)}{EIl} \quad (b)$$

Letting $P_m$ = the equivalent tensile load (in pounds) acting on the cross-sectional area of the test structure immediately below the channel section, required to result in a strain $\epsilon_m$ on the test structure, and $d$ = the thickness of the test structure cross section $$P_m = \epsilon_m E_m b d \quad (c)$$

Finally, letting $SC$ = the strength contribution of the channel section to the test structure, (percent)

$$SC = \frac{P}{P_m} \times 100 \quad (d)$$

Knowing typical gauge factors of semiconductor strain gauge elements one can choose a desensitization factor, $DF$, which will still provide usable gauge sensitivity. Equation $a$ can then be used to determine the physical dimensions of the channel section carrier member. A determination of the carrier member material, in view of the expected strain of the test structure, can be made by reference to Equation $b$. Finally, use of Equations $c$ and $d$ enables a check to insure that the strength contribution of the channel section to the test structure is negligible.

*Temperature compensation*

To achieve true temperature compensation for the device of the present invention, three objectives must be accomplished. First, the gauge must be compensated for zero shift with temperature. Second, the gauges for static use should be essentially drift free over the entire operating range. And third, the decrease in gauge sensitivity at increasing temperatures should be minimal or negligible.

Zero shift with temperature is a function of the strain induced by the expansion of the channel section carrier member and the test structure, and also of the zero shift characteristics of the gauge elements in the unbonded condition. The carrier member is fabricated from a material having a temperature coefficient of expansion very close to that of the semiconductor gauge elements. If the channel section has a thermal coefficient of expansion of $\alpha_c$ and is unrestrained, the unit strain, $\epsilon$, induced into the gauge by raising the temperature an amount $\Delta t$ would be $\epsilon = \alpha_c \Delta t$ (tension). However, the channel section is partially restrained due to the cantilever action of the flanges of the channel when the carrier member is attached to the test structure. The degree of restraint is a function of the geometry of the gauge, but in general will be small. With the carrier member thus restricted, the strain introduced into the gauge element by expansion of the channel section with temperature would then be $\epsilon_1 \approx \alpha_c \Delta t$ (tension).

For the same reason that the gauge elements on the channel section are subjected to a fraction of the actual strain on the test structure they are also subjected to a fraction of the expansion per unit length of the test structure due to temperature increases. If the test structure has a thermal coefficient of expansion of $\alpha_m$ and the temperature of the structure is increased by an amount $\Delta t$, the unit expansion $\epsilon = \alpha_m \Delta t$. The gauge element, however, is subjected to a strain $$\epsilon_2 = \frac{\alpha_m \Delta t}{DF}$$

and this strain is compressive if the gauge elements are bonded to the top side of the channel web as shown in FIGURE 1.

The gauge elements in effect are subjected to temperature induced strains from two sources: firstly, by the partially restained expansion of the carrier member; and secondly, from the expansion of the test structure. By placing the gauge elements on the outermost surface of the channel web, as shown, an important compensating effect is achieved since the two temperature induced strains then oppose each other, one being a tensile strain and the other a compressive strain. And, to minimize the effect of expansion with temperature $\epsilon_1$ should approximately equal $\epsilon_2$, or $\alpha_c$ should approximately equal $\alpha_m/DF$.

Further temperature compensation can be achieved by mounting two selected semiconductor strain gauge elements to the carrier member with a suitable cement. One of the elements is of P type semiconductor material having a predetermined positive gauge factor ($GF_P$) and the other is N type semiconductor material having a predetermined negative gauge factor ($GF_n$). Silicon is the preferred semiconductor material for the gauge elements, the P type conductivity being achieved by boron doping and the N type conductivity by arsenic doping. Any method well known in the art can be used in doping the semiconductor material. The resistivity and crystallographic orientation of the two gauge elements are such that when used in adjacent legs of a bridge circuit the gauge is essentially free from zero shift with temperature when mounted on a material having a specific thermal coefficient of expansion. The temperature compensating technique can best be explained by referring to FIGURES 3 and 4. FIGURE 3 is a graph generally illustrating the unit change of resistance ($\Delta R/R$) as a function of temperature for various semiconductor gauge elements of a certain typical resistivity. The line 41 represents the resistance change characteristic of an unbonded P type semiconductor gauge element (positive gauge factor). The line 42 represents the resistance change characteristic of an unbonded N type semiconductor gauge element (negative gauge factor). (Actually, the lines 41 and 42 are substantially coincident but are shown separately for ease of illustration.) The line 43 represents the resistance change characteristics of the aforementioned P type semiconductor gauge element after bonding to the channel section of the carrier member of the present invention and attachment of the carrier member to a test structure. The line 44 represents the resistance change characteristics of the aforementioned N type semiconductor gauge element upon bonding to the channel web of the carrier member and the attachment of the carrier member to the test structure. Letting the slope of each line be identified by the symbol $\lambda_{41}$, $\lambda_{42}$, etc., and $\alpha_s = TC$ for the unbonded gauge element, the following relationships exist:

$$\lambda_{41} = \lambda_{42}$$
$$\lambda_{43} - \lambda_{41} = GF_P(\alpha_s - \alpha_G)$$

and $$\lambda_{41} - \lambda_{44} = GF_N(\alpha_s - \alpha_G)$$

FIGURE 3 illustrates the condition when both the P and N type gauge elements have the same zero shift with temperature when in the unbonded condition (lines 41 and 42 are coincident). For this condition $\lambda_{41} = \lambda_{42}$. Upon attachment to a given test structure the slope of the P type gauge element curve line 41, increases by the amount $GF_P(\alpha_s - \alpha_G)$, while the slope of the N type gauge element curve, line 42, decreases by the amount $$GF_N(\alpha_s - \alpha_G)$$

since the gauge factor of the N type gauge element is negative. The slopes of the gauge element curves after bonding are shown by lines 43 and 44. Since the slopes of lines 43 and 44 are different, $\lambda_{43} \neq \lambda_{44}$ and the gauge would not be compensated for zero shift with temperature. A study of FIGURE 4 indicates the technique required to achieve zero shift with temperature compensation. FIGURE 4 is the same type of graph as that of FIGURE 3, where line 45 represents the resistance characteristics of the unbonded P type gauge element. The line 46 represents the resistance characteristics of the unbonded N type gauge element. The line 47 represents the resistance characteristics of the P type gauge element upon bonding to the channel web and attachment of the carrier member to the test structure, and line 48 represents the resistance characteristics of the N type gauge element upon bonding to the channel web and attachment of the carrier member to the test structure. (The lines 48 and 47 are actually substantially coincident, but are shown separately for ease of illustration.) To achieve the desired temperature compensation the N type gauge element material is selected so that the slope ($\lambda_{46}$) of the zero shift with temperature curve line 46 is greater than the slope of the P type gauge element material, line 45, by the amount $GF_p(\alpha_s - \alpha_G) - GF_n(\alpha_s - \alpha_G)$ when the gauge elements are unbonded. Thus, after attaching the carrier member to a test structure having a TC of $\alpha_m$, the N and P type gauge element zero shift with temperature curves will coincide, i.e., $\lambda_{48} = \lambda_{47}$. Hence, when these gauge elements are used in adjacent legs of a bridge circuit, there will be no shift of the zero point upon increases in temperature.

The drift rate (zero shift with time) of solid state gauge elements is considerably lower than the drift rate of conventional wire and foil gauges at 700° F. and 800° F. Hence the use of semiconductor gauge elements provides an additional advantage over wire and foil gauge elements.

The sensitivity of both N and P type gauge elements decreases with increasing temperature. The loss of sensitivity can be minimized, however, by using a constant current supply for the bridge circuit rather than a constant voltage supply, or by employing an asymmetric bridge such as that illustrated in FIGURE 5. Referring to FIGURE 5 the resistances 51 and 52 represent the resistances of the active gauge elements, one having a positive gauge factor and the other having a negative gauge factor. The resistances 53 and 54 are identical fixed resistances having values at least ten times as great as the resistances 51 and 52 representing the resistance of the gauge elements.

Utilization of a constant current supply for the bridge, or utilization of an asymmetric bridge circuit with a high value of fixed resistance as shown in FIGURE 5, results in a percentage sensitivity loss with increasing temperature approximately equal to the percentage decrease of $\Delta R$ with increasing temperature. The reduction in sensitivity (gauge factor) is less than 1% per 100° F. temperature rise. (As utilized herein, the term "symmetrical bridge" refers to a bridge circuit wherein the resistances of all branches are equal, and the term "asymmetrical bridge" refers to a bridge circuit wherein the resistances of all branches are not equal.) In contrast, utilization of the common symmetrical bridge circuit with a constant voltage supply results in a percentage sensitivity loss with increasing temperature approximately equal to the percentage decrease of $\Delta R/R$ with increasing temperature. The reduction in gauge factor is about 10% per 100° F. temperature rise. It is thus seen that the preferred circuitry provides a temperature response characteristic which compares favorably with the conventional wire or foil gauges.

The physical characteristics and performance of a strain gauge constructed in accordance with the principles of the present invention will now be described hereinbelow under the heading "Specific example."

Specific example

Utilizing Equation $a$ hereinabove, a channel-shaped carrier member was designed for a theoretical desensitization factor (DF) of 15. The carrier member was constructed of Rodar alloy and was approximately one inch long and one-half inch high. The carrier member was instrumented with a silicon gauge element of known positive gauge factor, the element being bonded to the outermost surface of the channel web. The gauge element was a standard 350 ohm element of P type conductivity silicon of [111] crystallographic orientation and a resistivity of 0.017 ohm-centimeter. The actual resistance change characteristics of silicon crystal bodies of various resistivities are shown in FIGURE 6.

Upon mounting the gauge to a test structure which was then subjected to a known unit stress, the desensitization factor was determined experimentally from the relationship $$DF = \frac{\epsilon_m}{\epsilon_o}$$

and found to be 15.1, thereby confirming the design Equation $a$.

A check of the compensation for zero shift with temperature was made by heating the completed gauge and measuring the apparent strain induced in the gauge element. Multiplying the apparent strain by the known gauge factor of the element gives the relative resistance change per unit of resistance. The results are presented graphically in FIGURE 7, wherein the relative resistance change is expressed at the percentage increase in unit resistivity and is plotted as a function of temperature. The line 55 represents a temperature increase in resistivity of the gauge element bonded to the Rodar carrier member of the present invention, while the line 56 represents the temperature increase in resistivity of the gauge element in an unbonded condition. A study of FIGURE 7 shows that the device of the present invention is adequately compensated for zero shift with temperature.

An additional test was made of the complete gauge of the present invention by subjecting it to a temperature of 800° F. for a period of 11 hours, during which time no change in resistivity was detected, thereby indicating a negligible drift rate.

The standard 350 ohm semiconductor gauge element was also tested for sensitivity as a function of temperature while the element was connected in a simulated bridge circuit with a constant current supply and in a simulated bridge circuit with the usual constant voltage supply. The gauge element was bonded to the surface of a 17-4 steel test structure which was then subjected to a constant strain of 500 micro-inches per inch, the strain then being held constant at this value while the temperature was increased. The results are plotted in FIGURE 8 wherein the percentage of sensitivity is plotted as a function of temperature, with the sensitivity of the element at room temperature being designated as 100%. The line 57 represents the percentage sensitivity of the gauge element in the simulated constant current bridge circuit, and the line 58 represents the percentage sensitivity of the gauge element utilized in a simulated constant voltage bridge circuit. A study of FIGURE 8 indicates that, as hereinabove stated, utilization of a constant current supply for the bridge results in a percentage sensitivity loss with increasing temperature approximately equal to the percentage decrease of $\Delta R$ with increasing temperature, the reduction in sensitivity being less than 1% per 100° F. temperature rise. In contrast, utilization of the common symmetrical bridge circuit with a constant voltage supply results in a percentage sensitivity loss with increasing temperature approximately equal to the percentage decrease of $\Delta R/R$ with increasing temperature, the reduction in gauge factor being about 10% per 100° F. temperature rise.

The illustrated embodiment of FIGURE 1 can be used to measure strains on test structures at temperatures of 2000° F. or more by the utilization of fluid cooling, as shown in FIGURE 2 of the drawing. The web 13 of the channel 14 is disposed within a fluid-tight enclosure 21. The enclosure 21 is fitted with a fluid inlet pipe 22 and a fluid outlet pipe 23 for the passage of fluid across the gauge elements 11 and 12 and the channel web 13. The size of the enclosure 21 in conjunction with the fluid flow rate, should be sufficient to maintain the web 13, and hence the gauge elements 11 and 12, at a temperature not in excess of 800° F.

Lead wires 31, 32 and 33 are pased though the fluid inlet pipe and provide the necessary bridge connections to the elements 11 and 12. The lead 31 is connected to one end of the element 11. The lead 32 is connected to one end of the element 12, and the lead 33 is connected to the other ends of the elements 11 and 12.

Thus, there has been described a novel semiconductor strain gauge device which is temperature compensated and capable of accurately measuring post-yield stresses at high temperatures beyond the capabilities of prior art devices. Although the invention has been described with a certain degree of particularity, it is understood that the present disclosure has been made only by way of example and that numerous changes in the details of construction and the combination and arrangement of parts may be resorted to without departing from the spirit and scope of the invention hereinafter claimed. For example, although a channel section shape was utilized for the carrier member in the illustrated embodiment to provide for fluid cooling of the gauge elements, other forms of carrier members can be utilized while still providing the desired feature of inducing a strain into the gauge element upon thermal expansion of the carrier member opposite in effect to that induced by a temperature increase of the test structure. In addition, the carrier member may be instrumented in different ways and with different circuitry, such as by utilizing a single gauge element bonded to the outermost surface of the carrier web, or by utilizing gauge elements bonded both to the outermost and innermost surfaces of the web of the channel section so that one element in tension and the other in compression upon expansion of the test structure.

What is claimed is:

1. A solid state strain gauge for mounting to a test structure of a predetermined thermal coefficient of expansion comprising, in combination: a solid state strain gauge element; and, a carrier member adapted for mounting to the test structure, said carrier member having a predetermined thermal coefficient of expansion, said strain gauge element being bonded to a predetermined portion of said carrier member, the configuration of said carrier member being such that strain induced in said strain gauge element by thermal expansion of said predetermined portion of said carrier member will oppose strain induced in said strain gauge element by thermal expansion of the test structure to which said gauge is mounted, the thermal coefficient of expansion of said carrier member being in such relationship to the thermal coefficient of expansion of said test structure that the magnitude of the strain induced in said strain gauge element by thermal expansion of said carrier member will be substantially equal to the magnitude of the strain induced in said strain gauge element by thermal expansion of said test structure upon an increase in the temperature of said test structure.

2. A solid state strain gauge for mounting to a test structure of a predetermined thermal coefficient of expansion comprising, in combination: a semiconductor strain gauge element having a predetermined thermal coefficient of expansion; and, a carrier member constructed of a material having a thermal coefficient of expansion similar to that of said semiconductor strain gauge element, said carrier member being adapted for mounting to the test structure, said strain gauge element being bonded to a predetermined portion of said carrier member, the configuration of said carrier member being such that strain induced in said predetermined portion of said strain gauge element by thermal expansion of said carrier member will oppose strain induced in said element by thermal expansion of the test structure to which said gauge is mounted, the thermal coefficient of expansion of said carrier member being in such relationship to the thermal coefficient of expansion of said test structure that the magnitude of the strain induced in said strain gauge element by thermal expansion of said carrier member will be substantially equal to the magnitude of the strain induced in said strain gauge element by thermal expansion of said test structure upon an increase in the temperature of said test structure.

3. A solid state strain gauge for mounting to a test structure comprising, in combination: a semiconductor strain gauge element having a predetermined thermal coefficient of expansion; and, a carrier member constructed of a material having a thermal coefficient of expansion ($\alpha_c$) similar to that of said semiconductor gauge element, said carrier member defining a channel section having flanges separated by a web, the ends of the flanges of said channel section being adapted for hinged connection to the test structure, said gauge element being bonded to the outermost surface of the web of said channel section with said element being longitudinally aligned along said web, the thermal coefficient of expansion of said carrier member being determined in accordance with the following relationship:

$$\alpha_c \frac{\alpha_m l t}{2h(l+2/3h)}$$

Where $l$=web length of said channel section, $t$=web thickness of said channel section, and $h$=flange length of said channel section.

4. A solid state strain gauge for mounting to a test structure comprising, in combination: a first semiconductor strain gauge element, said first element having a predetermined positive gauge factor; a second semiconductor gauge element, said second element having a predetermined negative gauge factor; and, a carrier member defining a channel section having flanges separated by a web, the ends of the flanges of said channel section having means for hingedly connecting said section to a test structure, said first and said second gauge elements being disposed in parallel relationship on the outermost surface of the web of said channel section and longitudinally extending along said web.

5. A solid state strain gauge for mounting to a test structure comprising: a first semiconductor strain gauge element, said first element having a predetermined positive gauge factor ($GF_P$) and a predetermined thermal coefficient of expansion ($\alpha_G$) and a predetermined resistance change characteristic; a second semiconductor strain gauge element, said second element having a predetermined negative gauge factor ($GF_n$) and said predetermined thermal coefficient of expansion ($\alpha_G$) and a predetermined resistance change characteristic; and, a carrier member adapted for mounting to the test structure, said first and said second semiconductor strain gauge elements being bonded to predetermined portions of said carrier member, said first and said second semiconductor strain gauge elements being adapted for electrical connection to adjacent legs of an electrical bridge circuit, the gauge factors of said semiconductor elements being determined in accordance with the following relationship:

$$\lambda_P - \lambda_N = GF_P(\alpha_S - \alpha_G) - GF_N(\alpha_S - \alpha_G)$$

where $\lambda_P$=slope of the resistance change characteristic of said first semiconductor element plotted as a function of temperature, $\lambda_N$=slope of the resistance change characteristic of said second semiconductor element plotted as a function of temperature, $\alpha_G$=thermal coefficient of expansion of said first and said second semiconductor gauge elements in the unbonded condition, and $\alpha_S$=effective thermal coefficient of expansion of said first and said second semiconductor gauge elements bonded to said carrier member mounted to the test structure.

6. A solid state strain gauge for mounting to a test structure comprising: a first semiconductor strain gauge element, said first element having a predetermined positive gauge factor ($GF_P$) and a predetermined thermal coefficient of expansion ($\alpha_G$) and a predetermined resistance change characteristic; a second semiconductor strain gauge element, said second element having a predetermined negative gauge factor ($GF_n$) and said predetermined thermal coefficient of expansion ($\alpha_G$) and a predetermined resistance change characteristic; and, a carrier member adapted for mounting to the test structure, said carrier member having said predetermined thermal coefficient of expansion ($\alpha_G$), said first and second semiconductor strain gauge elements being bonded to predetermined portions of said carrier member, the gauge factors of said semiconductor elements being determined in accordance with the following relationship:

$$\lambda_P - \lambda_N = GF_P(\alpha_S - \alpha_G) - GF_N(\alpha_S - \alpha_G)$$

where $\lambda_P$=slope of the resistance change characteristic of said first semiconductor element plotted as a function of temperature, $\lambda_N$=slope of the resistance change characteristic of said second semiconductor element plotted as a function of temperature, $\alpha_G$=thermal coefficient of expansion of said first and said second semiconductor gauge elements in the unbonded condition, and $\alpha_S$=effective thermal coefficient of expansion of said first and said second semiconductor gauge elements bonded to said carrier member mounted to the test structure.

References Cited by the Examiner
UNITED STATES PATENTS

| | | | |
|---|---|---|---|
| 2,316,975 | 4/43 | Ruge | 73—88.5 X |
| 2,472,045 | 5/49 | Gibbons | 73—88.5 X |
| 2,637,210 | 5/53 | Hathaway | 73—88.5 X |
| 2,939,317 | 6/60 | Mason | 73.88.5 X |
| 3,034,345 | 5/62 | Mason | 73—141 |
| 3,102,420 | 9/63 | Mason | 73—141 X |

RICHARD C. QUEISSER, *Primary Examiner.*

ROBERT EVANS, JOSEPH P. STRIZAK, *Examiners.*